United States Patent [19]
Syring

[11] Patent Number: 4,699,391
[45] Date of Patent: Oct. 13, 1987

[54] GONDOLA DOLLY

[76] Inventor: Milo J. Syring, 20060 SE. Foster, Boring, Oreg. 97009

[21] Appl. No.: 909,913

[22] Filed: Sep. 22, 1986

[51] Int. Cl.$^4$ .............................................. B62B 5/00
[52] U.S. Cl. ............................................... 280/79.1 A
[58] Field of Search ............... 280/62, 79.1 R, 79.1 A, 280/79.2, 79.3, 47.34

[56] References Cited
U.S. PATENT DOCUMENTS

| | | | |
|---|---|---|---|
| 2,314,129 | 3/1943 | Daley | 280/79.1 R |
| 2,627,425 | 2/1953 | McNamara | 280/62 |
| 3,717,357 | 2/1973 | Schaefer | 280/79.1 R |
| 3,831,959 | 8/1974 | Fontana | 280/79.1 R |
| 4,178,006 | 12/1979 | Johnson | 280/79.1 A |
| 4,471,971 | 9/1984 | Keesler | 280/79.1 A |

Primary Examiner—John J. Love
Assistant Examiner—Richard Camby
Attorney, Agent, or Firm—James D. Givnan, Jr.

[57] ABSTRACT

A dolly comprising angular side and end members jointly defining a recessed area terminating at a bottom plate. A resilient pad on the bottom plate serves to receive loads and prevent slipping of a gondola cross member. Caster wheels are affixed to the underside of the angular side members and end members which members have coplanar upper surfaces. A vertical flange on the end member is in edge abutment with the side members and the bottom plate to permit securement by welds.

4 Claims, 5 Drawing Figures

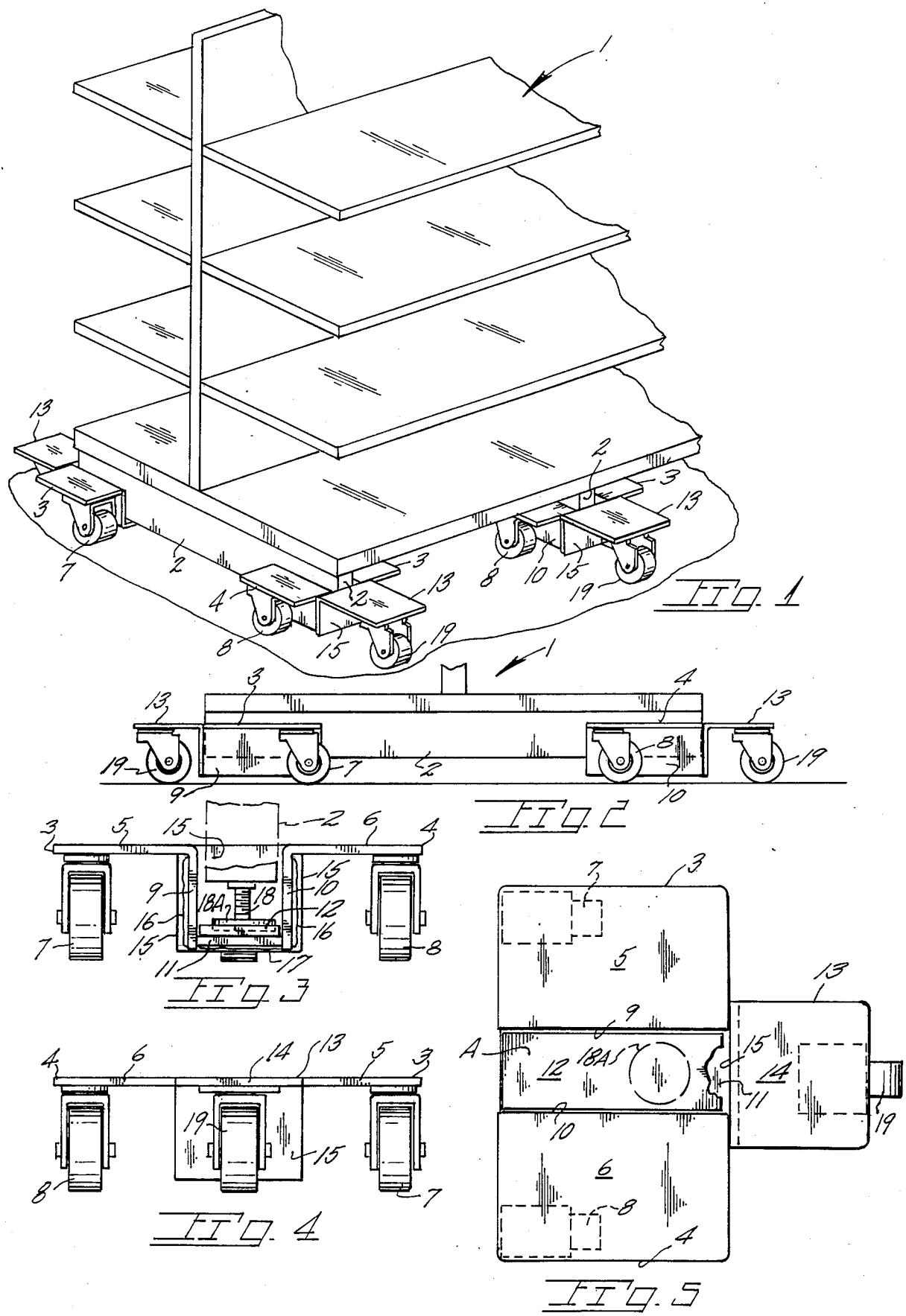

GONDOLA DOLLY

BACKGROUND OF THE INVENTION

The present invention pertains to dollies for the temporary support of large and heavy structures to facilitate movement of same.

A problem encountered in self-service food stores and markets is that the gondolas used for the display of food products and other merchandise must be moved occasionally for maintenance or store remodeling purposes. As shelf equipped gondolas are of considerable size and weight, the task of moving same is formidable. Heretofore, the operation involved the unloading and some disassembly of the gondola. Needless to say such effort from a manhour viewpoint is costly.

In the prior art U.S. Pat. No. 3,717,357 shows a dolly with a wall mounted cushioning member for carrying plywood panels; U.S. Pat. No. 2,314,129 discloses a dolly with a three sided support member with right angularly intersecting walls; U.S. Pat. No. 2,627,425 shows a dolly with a resilient surface with a recessed area therebelow.

SUMMARY OF THE PRESENT INVENTION

The present invention is embodied in a dolly particularly suited for installation below a gondola base member to facilitate moving the gondola across a floor surface.

The present dolly has a recessed frame providing a low slung support which receives a gondola base member in a stable manner. Upright wall surfaces of the dolly prevent tipping of the gondola while a resilient bottom surface of the dolly prevents accidental separation of the gondola base member and the dolly. Widely spaced caster wheels additionally contribute towards stable support of the gondola. Angle side and end members provide an extremely strong structure of low cost fabrication.

Important objectives of the present invention include the provision of a dolly readily insertable below a gondola base and having upright wall surfaces to confine the gondola against tipping; the provision of a dolly having a gondola supporting surface of a resilient nature to prevent accidental dolly/gondola separation; the provision of a dolly having a low slung support surface to minimize lifting of the article to be moved.

BRIEF DESCRIPTION OF THE DRAWINGS

In the accompanying drawings:

FIG. 1 is a perspective view of a gondola being supported by dollies embodying the present invention;

FIG. 2 is an end elevational view of FIG. 1;

FIG. 3 is a front elevational view of the dolly;

FIG. 4 is a rear elevational view of same; and

FIG. 5 is a plan view of same.

DETAILED DESCRIPTION OF THE PREFERRED EMBODIMENTS

With continuing attention to the drawings wherein applied reference numerals indicate parts similarly hereinafter identified, the reference numeral 1 indicates generally a structure termed a gondola or display island in the grocery store trade and on which merchandise is stored and displayed. Such gondolas have floor supported frames which include cross members 2 of vertical rectangular section which are arranged transversely to the gondola axis and at spaced intervals therealong.

The present dolly includes a pair of angle side members at 3 and 4 which are of right angular shape in section having uppermost horizontal flanges at 5 and 6. Secured to the underside of flanges 5 and 6 are caster wheels 7 and 8. Caster wheel securement is preferably by welding with the fixed portion of the caster wheel secured to the flange underside. Vertical flanges 9 and 10 of the side members partially define a recessed area A closed at the bottom by a plate 11 welded along its sides to the lower extremities of the vertical flanges. In place on bottom plate 11 is a pad 12 of resilient material suitably secured in place by an adhesive to prevent dislodgement.

An angle end member 13 of the present dolly includes an uppermost flange 14 coplanar with the flanges 5 and 6 of the side members. A vertical flange 15 of end member 13 is in abutment with corresponding edges of side members 3 and 4 and with bottom plate 11 to permit securement as by welds at 16 and 17. The recessed area at A, defined by the side members and end member 13 is of a size and shape to receive an end segment of a gondola base 2 which may be equipped with an adjustable leveling device of the type shown at 18 and having a foot 18A. The resilient pad 12 is compressed by foot 18A to thereafter inhibit slippage of the foot and base 2 out of the dolly. A caster wheel 19 supports end member 13.

The plate member 11 is located immediately above the floor surface to permit installation of the dolly below the gondola base with minimum elevation of the gondola.

In use, one side of the gondola is elevated slightly to enable the insertion of a dolly under an end of each cross member 2. The remaining side of the gondola is then lifted for insertion of a dolly under the remaining ends of the cross members. The pads 12 retain the leveler foot 18A in place to permit moving of the gondola about without risk of a cross member end sliding off of bottom plate 11.

While I have shown but one embodiment of the invention, it will be apparent to those skilled in the art that the invention may be embodied still otherwise without departing from the spirit and scope of the invention.

Having thus described the invention, what is desired to be secured in a Letters Patent is:

1. A dolly for insertion below a store gondola cross member, said dolly comprising, angle side members disposed in parallel and each having a vertical flange, an angle end member having a vertical flange to which the vertical flange of each of said angle side members is edgewise attached to interconnect the corresponding ends of said side members, a bottom member disposed between the vertical flanges of said side members and adapted to support said gondola cross member, and caster wheels affixed one each to said side members and said end member.

2. The dolly claimed in claim 1 additionally including a pad secured in place on and overlying said bottom member, said pad serving to prevent slippage of an article thereon.

3. The dolly claimed in claim 1 wherein said side members and said end member have coplanar flanges on which are carried said caster wheels.

4. The dolly claimed in claim 1 wherein said side members and said bottom member are in welded securement to said vertical flange of said end member.

* * * * *